Nov. 3, 1959   W. T. MEARS   2,911,522
HEADLAMP ADJUSTER
Filed May 13, 1957
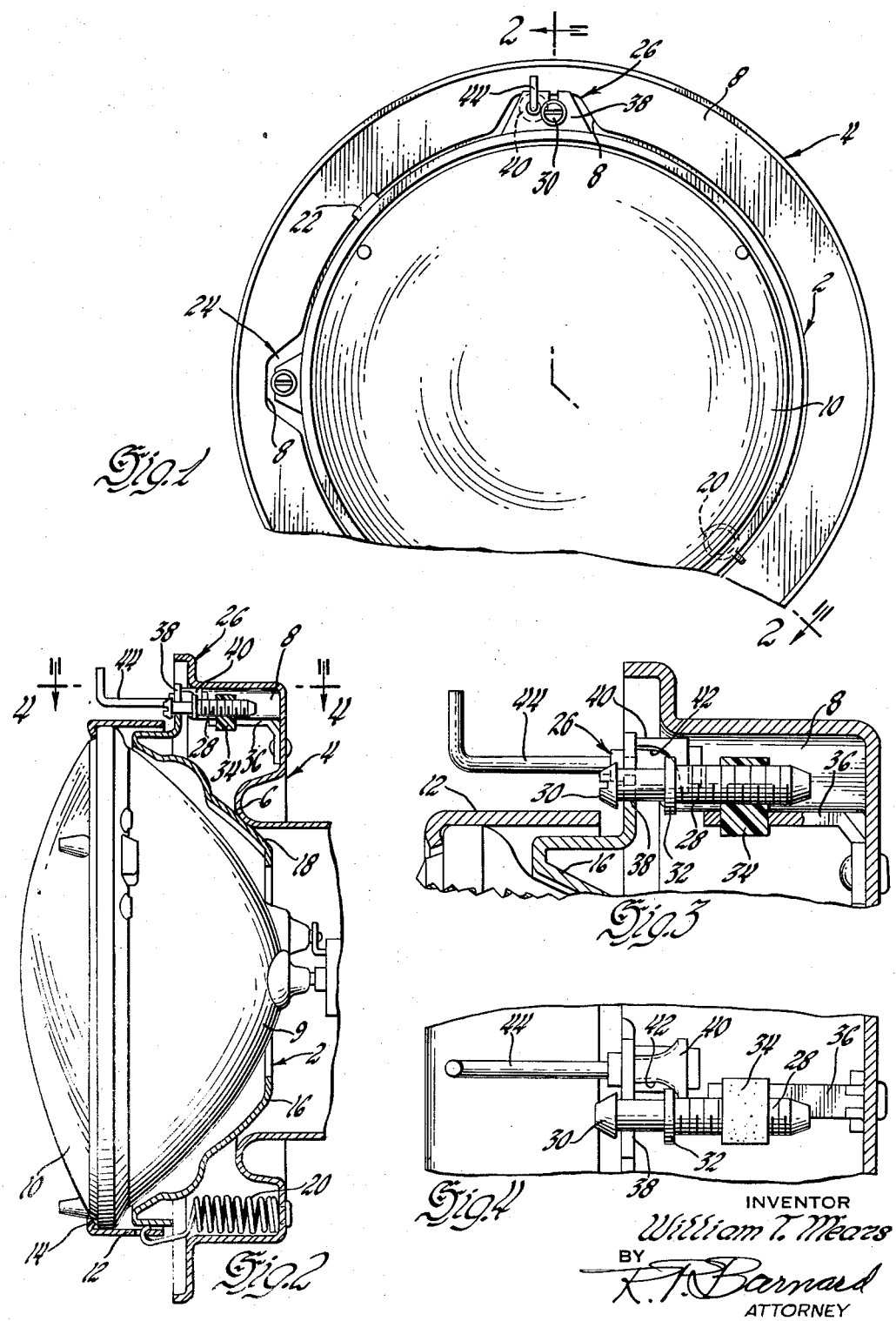
INVENTOR
William T. Mears
BY
R. F. Barnard
ATTORNEY United States Patent Office 2,911,522
Patented Nov. 3, 1959

2,911,522

HEADLAMP ADJUSTER

William T. Mears, Anderson, Ind., assignor to General Motors Corporation, Detroit, Mich., a corporation of Delaware Application May 13, 1957, Serial No. 658,726

6 Claims. (Cl. 240—41.6)

The present invention relates to an adjusting or aiming mechanism for a headlamp assembly commonly known as the ball and socket type and is an improvement in the mechanism disclosed in the copending application of Robert N. Falge, Gerald R. Broshar and Ray Manning, Serial No. 658,777, filed May 13, 1957. More specifically, the present invention relates to primary and secondary adjusting or aiming means for the beam of such an assembly, the secondary aiming or adjusting means being operative to aim the headlamp beam to a predetermined fixed extent irrespective of the adjusted position of the primary means and without disturbing the latter's adjustment.

Almost all, if not all, major manufacturers of headlamp assemblies now utilize what may be termed a ball and socket mounting. Such an assembly and mounting is typically depicted in the patent to Howard C. Mead and Robert D. Winkelmeyer No. 2,266,329. Such mountings typically include a ball member universally adjustably mounted in a socket member formed on a supporting housing located within a vehicle fender. The ball member forms a sub-assembly usually including a sealed beam headlamp unit operatively clamped between a retaining ring and a mounting ring, the latter being in adjustable universal bearing engagement with the socket member. The ball member includes a sealed lens, reflector and light unit or bulb fixedly mounted within the unit relative to the reflector. Thus, the aforementioned various components of the sealed beam unit are at all times in a fixed relation relative to each other thereby facilitating the design of the lens to provide optimum beam patterns.

As taught in this art, spring means and aiming screws are circumferentially spaced about the assembly and operatively interconnected between the ball and socket members for adjustably mounting the ball member within the socket member. It is usual practice to provide at least two aiming screws mounted respectively on the horizontal and vertical axis of the assembly for cooperation with the spring means for universally adjusting the ball member.

A serious problem has developed with the use of these and other headlamp assemblies with heavy vehicles, particularly those including a tractor drawing a semi-trailer. For example, the aiming screws may be adjusted to provide the desired headlamp aim according to State established standards, but thereafter this aim may be seriously disrupted by loading of the vehicle. As an illustration, when the tractor alone is used, the headlamp beam may be adjusted to the required setting. When a semi-trailer is then attached to such a tractor, the latter in effect pivots about its rear axle resulting in upward projection of the headlamp beam to an undesired blinding and illegal extent. Furthermore, as the trailer is loaded this condition is further accentuated.

As a practical illustration of this undesirable situation, tests have been run on various types of track tractors and semi-trailers to determine the degree in which headlamp aim is disrupted by the loaded and unloaded conditions, and where the tractor is detached from the trailer. In one type of tractor-trailer combination which was to be loaded with ten tons, the headlamp assembly was adjusted to a reference point. As a matter of fact, this reference point was selected as one in which there was no aim upwardly or downwardly from the horizontal when the tractor-trailer combination was loaded. Upon unloading the trailer, the headlamp beam was then down-aimed five inches. After the trailer was detached from the tractor, the down-aim increased to eleven inches.

In another manufacturer's truck having a trailer attached thereto, the vehicle was loaded with fifteen tons. The headlamps were aimed to the reference point. When the vehicle was unloaded, a two inch down-aim occurred, and when the trailer was detached this down-aim increased to a little more than four inches.

As aforementioned, all of the various States have regulations governing the maximum extent to which headlamp beams are to be aimed upwardly in a vertical plane. From the examples cited above, it will be readily appreciated that the required setting will not always be obtained. Moreover, in the examples cited above, the headlamps were initially adjusted with the vehicle under load so that as the vehicles were unloaded only down-aim would occur. It will be readily appreciated that it often happens that the headlamps are initially adjusted on the tractor without the trailer or any other load being attached or imposed thereon. Thus, upon attaching the trailer and loading the latter, an extreme degree of upward aim occurs which, of course, is very dangerous to the drivers of oncoming vehicles and a violation of the aforementioned regulations.

It is intended, therefore, within the scope of this invention to provide an aiming device for vehicles of the general class described in which the aim of the headlamp may be manually selectively adjusted to compensate for various loaded conditions of the vehicle. More particularly, it is intended to provide a headlamp assembly of the type aforementioned with a primary aiming means to initially set the headlamp beam, and a secondary aiming means manually selectively operable to establish a desired degree of down-aim after the vehicle is loaded.

Moreover, within the scope of this invention, the aforementioned primary and secondary aiming means are so constructed and arranged that the secondary aiming means may be actuated irrespective of and without disturbing the setting of the primary aiming means whereby, at any desired time, the initially established headlamp aim may be obtained.

Referring now to the drawings:

Figure 1 is a fragmentary front elevation of the headlamp assembly;

Figure 2 is a cross section taken on line 2—2 of Fig. 1;

Figure 3 is an enlarged view of the aiming mechanism of Fig. 2; and

Figure 4 is a cross section taken on line 4—4 of Fig. 2.

In the drawings, there is disclosed a ball and socket headlamp assembly comprising a ball or sub-assembly member 2 adapted to be universally adjustably mounted in a supporting housing 4 located within a vehicle fender. The supporting housing 4 includes an annular rolled rim 6 surrounded by a circumferentially extending channel 8.

The ball member 2 includes a sealed beam headlamp unit 9 comprising the usual lens 10 and a lighting unit, not shown, fixedly secured relative to a reflector, also not shown. The design of the sealed beam unit 9 is such that the lighting unit is located in the desired position on the axis of the sealed beam unit relative to the reflector and optic design of the lens 10 to provide the desired beam patterns.

The ball member 2 further includes an annular retaining ring 12 having an inwardly turned lip 14 engaging an annular flange on the sealed beam unit. The sealed beam unit is seated in a mounting ring 16 having a plurality of spherical bearing surfaces 18 adjustably seated on the rolled rim or socket member 6 of the support housing 4. The sealed beam unit is effectively clamped between the retaining ring and mounting ring by means of a resilient spring 20 grounded within the annular channel 8 of the support housing and operatively connected in any suitable manner to the retaining ring 12. Moreover, a spring clip 22 is carried by the mounting ring and projects through a suitable aperture in the retaining ring 12 at a point preferably diametrically opposite from the spring 20.

The aiming means 24 and 26 are circumferentially spaced from the spring 20 and spring clip 22 and are preferably located respectively on the horizontal and vertical axes of the headlamp assembly.

It is customary that each aiming mechanism include a bracket suitably located within the annular channel 8 of the support housing to carry an aiming nut into which there is threadably secured an aiming screw secured to a slotted mounting ring flange or ear. Thus, in the conventional structure described, the aiming screws may be selectively adjusted to universally adjust the ball member 2 within the housing 4 at the points of bearing between the rolled rim 6 and mounting ring 16.

To provide a secondary aiming means which may be selectively manually actuated to provide a desired degree of down-aim upon loading of the vehicle, the aiming mechanism 26 located on the vertical axis of the assembly is modified as shown in Figs. 2 to 4.

In this construction, the aiming mechanism 26 located on the vertical axis of the assembly includes a primary aiming screw 28 having a head 30 and axially spaced annular shoulder 32, and an externally threaded portion adjustably received by an aiming nut 34, which is preferably made of nylon, fixed on a bracket 36 secured in the annular channel 8 of the support housing. A slotted mounting ring flange 38 engages the aiming screw 28 for relative axial movement therewith as limited by the aiming screw head 30 and shoulder 32. A secondary aiming means includes a cylindrical barrel 40 having a cam surface 42, the cam barrel being rotatively mounted on the mounting ring flange for movement therewith adjacent the primary aiming screw. A rotatable lever 44 is provided for selective rotation of the cam barrel. It will be noted that the secondary aiming means, as initially assembled, has its cam surface engaged with the peripheral edge of the annular shoulder 32 of the aiming screw.

In initially aiming the headlamp assembly, the cam barrel 40 will be rotated to pull the mounting ring flange 38 into abutment with the aiming screw shoulder 32, thereby locking the flange in this position. Thereafter, the respective primary aiming screws 28 may be threaded into their associated nuts to initially aim the lamp beam. It will be understood that the cam barrel 40 forms an operative connection between the mounting ring flange 38 and primary aiming screw 28 of mechanism 26 so that the ball member 2 will be adjusted as the primary screw 28 is rotated.

Upon the vehicle becoming loaded so that it is desired to down-aim the beam, the lever 44 may be rotated to allow the ball member 2 to tilt forwardly in the vertical longitudinal plane of the assembly until the slotted mounting ring flange 38 abuts the head of the primary aiming screw 28. While this type of assembly may be normally employed to provide only one degree of down-aim as determined by the distance between the head and shoulder of the primary aiming screw, it will be readily apparent that appropriate indicia may be provided on a portion of the structure adjacent lever 44 to accomplish a particular degree of down-aim between the limitations aforedescribed.

I claim:

1. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut and having axially spaced stops formed thereon, said ball member being connected to said primary aiming screw for movement relative thereto between maximum limits defined by said stops, secondary aiming means forming a direct connection between said ball member and said primary aiming screw and adjustable with the latter, said secondary aiming means being adjustable independently of said primary aiming screw to fixedly locate said ball member between said stops, and comprising a barrel rotatably mounted on said ball member, and a rotatable cam surface on said barrel operatively connected to said aiming screw whereby rotation of said barrel will reciprocate said ball member along said primary aiming screw between said stops.

2. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut and having axially spaced stops formed thereon, said ball member being connected to said primary aiming screw for movement relative thereto between maximum limits defined by said stops, secondary aiming means forming a direct connection between said ball member and said primary aiming screw and adjustable with the latter, said secondary aiming means being adjustable independently of said primary aiming screw to fixedly locate said ball member between said stops, and comprising a barrel rotatably mounted on said ball member adjacent the connection of the latter to said primary aiming screw, and a rotatable cam surface on said barrel operatively connected to said aiming screw whereby rotation of said barrel will reciprocate said ball member along said primary aiming screw between said stops.

3. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, an annular shoulder formed on said screw at a point axially spaced from the head of the latter, said ball member being connected to said primary aiming screw for movement relative thereto between maximum limits defined by said screw head and shoulder, secondary aiming means forming a direct connection between said primary aiming screw and ball member to fixedly locate the latter between said screw head and shoulder, said secondary aiming means comprising a barrel rotatably mounted on said ball member, and a cam surface on said barrel engaging the periphery of said screw shoulder whereby rotation of said barrel will reciprocate said ball member along said primary aiming screw between the head and shoulder thereof.

4. In combination, an adjustable headlamp assembly of the type comprising a supporting means including a socket member and a ball member adjustably mounted therein, said ball member comprising a lighting unit having a reflector, lens and light source fixed within the reflector; means yieldingly urging said ball member into engagement with said socket member, primary aiming means operatively connected between said ball and socket members at spaced points from said yieldable means and operative to variably adjust the position of said ball member in said socket member, at least one of said primary aiming means being located on the vertical axis of said ball member to adjust the beam of the lighting unit thereof in a vertical plane, said last named means including an aiming screw adjustably threadably secured in a nut secured to said supporting means, said screw having axially spaced stops formed thereon, said ball member being operatively connected to said aiming screw for movement relative thereto between said stops, a secondary aiming means forming a direct connection between said ball member and said primary aiming screw and adjustable with the latter, said secondary aiming means being adjustable independently of said primary aiming screw to fixedly locate said ball member between said stops and including a rotatable barrel mounted on said ball member and having a cam surface directly connected to said primary aiming screw, and manually selectively actuable lever means for rotating said barrel to reciprocate said ball member between said stops on said primary aiming screw.

5. In combination, an adjustable headlamp assembly of the type comprising a supporting means including a socket member and a ball member adjustably mounted therein, said ball member comprising a lighting unit having a reflector, lens and light source fixed within the reflector; means yieldingly urging said ball member into engagement with said socket member, primary aiming means operatively connected between said ball and socket members at spaced points from said yieldable means and operative to variably adjust the position of said ball member in said socket member, at least one of said primary aiming means being located on the vertical axis of said ball member to adjust the beam of the lighting unit thereof in a vertical plane, said last named means including an aiming screw adjustably threadably secured in a nut secured to said supporting means, said screw having a shoulder axially spaced a predetermined distance from the head thereof, said ball member being operatively connected to said aiming screw for movement relative thereto between said head and shoulder, a secondary aiming means adjacent said primary means and rotatably mounted on said ball member, said secondary aiming means including a rotatable barrel having a cam surface engaging said primary aiming screw shoulder, and manually selectively actuable lever means for rotating said barrel to reciprocate said ball member between said primary aiming screw head and shoulder.

6. In combination, an adjustable headlamp assembly of the type comprising a supporting means and a ball member adjustably mounted therein; said ball member comprising a lighting unit having a reflector, lens and light source fixed within the reflector, and a mounting therefor comprising a cup-shaped member extending over the reflector and having a spherical seating surface, a ring overlapping the front edge of the unit, means for securing the ring to the cup-shaped member and clamping the unit between them to form a sub-assembly; said supporting means for the sub-assembly including a socket within which the spherical seating surface of the cup-shaped member is engaged to provide a universal joint; means yieldingly urging said ball member into engagement with said socket member, primary aiming means operatively connected between said ball and socket members at spaced points from said yieldable means and operative to variably adjust the position of said ball member in said socket member, at least one of said primary aiming means being located on the vertical axis of said ball member to adjust the beam of the lighting unit thereof in a vertical plane, said last named means including an aiming screw adjustably threadably secured in a nut secured to said supporting means, said screw having a shoulder axially spaced a predetermined distance from the head thereof, said cup-shaped member being operatively connected to said aiming screw for movement relative thereto between said head and shoulder, a secondary aiming means adjacent said primary means and rotatably mounted on said cup-shaped member, said secondary aiming means including a rotatable barrel having a cam surface engaging said primary aiming screw shoulder, and manually selectively actuable lever means for rotating said barrel to reciprocate said ball member between said primary aiming screw head and shoulder.

References Cited in the file of this patent

UNITED STATES PATENTS

| | | |
|---|---|---|
| Re. 14,453 | MacDonald | Mar. 26, 1918 |
| 1,448,691 | Hunt | Mar. 13, 1923 |
| 2,504,327 | Gross | Apr. 18, 1950 |
| 2,605,388 | Theisen | July 29, 1952 |
| 2,733,335 | Falge | Jan. 31, 1956 |